(12) United States Patent
Asano

(10) Patent No.: US 11,482,727 B2
(45) Date of Patent: Oct. 25, 2022

(54) COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY

(71) Applicant: ZEON CORPORATION, Tokyo (JP)

(72) Inventor: Junichi Asano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 252 days.

(21) Appl. No.: 16/619,791

(22) PCT Filed: Jun. 6, 2018

(86) PCT No.: PCT/JP2018/021716
§ 371 (c)(1),
(2) Date: Dec. 5, 2019

(87) PCT Pub. No.: WO2018/235601
PCT Pub. Date: Dec. 27, 2018

(65) Prior Publication Data
US 2020/0127329 A1 Apr. 23, 2020

(30) Foreign Application Priority Data
Jun. 19, 2017 (JP) .............................. JP2017-119673

(51) Int. Cl.
| | | |
|---|---|---|
| H01M 10/0566 | (2010.01) | |
| H01M 4/62 | (2006.01) | |
| H01M 50/409 | (2021.01) | |
| H01M 50/431 | (2021.01) | |
| H01M 50/443 | (2021.01) | |
| H01M 10/0525 | (2010.01) | |
| H01M 50/449 | (2021.01) | |
| H01M 50/411 | (2021.01) | |
| H01M 50/414 | (2021.01) | |
| H01M 50/446 | (2021.01) | |
| H01M 50/451 | (2021.01) | |
| H01M 50/46 | (2021.01) | |
| H01M 50/42 | (2021.01) | |
| H01M 4/02 | (2006.01) | |

(52) U.S. Cl.
CPC ....... *H01M 10/0566* (2013.01); *H01M 4/622* (2013.01); *H01M 10/0525* (2013.01); *H01M 50/409* (2021.01); *H01M 50/411* (2021.01); *H01M 50/414* (2021.01); *H01M 50/42* (2021.01); *H01M 50/431* (2021.01); *H01M 50/443* (2021.01); *H01M 50/446* (2021.01); *H01M 50/449* (2021.01); *H01M 50/451* (2021.01); *H01M 50/46* (2021.01); *H01M 2004/027* (2013.01); *H01M 2004/028* (2013.01)

(58) Field of Classification Search
None
See application file for complete search history.

(56) References Cited

U.S. PATENT DOCUMENTS

2016/0351873 A1   12/2016   Sasaki

FOREIGN PATENT DOCUMENTS

| | | |
|---|---|---|
| CN | 106030858 A | 10/2016 |
| JP | 2013145763 A | 7/2013 |
| JP | 2016048670 A | 4/2016 |
| JP | 2016054302 A | 4/2016 |
| WO | 2015145967 A1 | 10/2015 |

OTHER PUBLICATIONS

Feb. 17, 2021, the Extended European Search Report issued by the European Patent Office in the corresponding European Patent Application No. 18819713.1.
Dec. 24, 2019, International Preliminary Report on Patentability issued in the International Patent Application No. PCT/JP2018/021716.
Aug. 28, 2018, International Search Report issued in the International Patent Application No. PCT/JP2018/021716.

*Primary Examiner* — Laura Weiner
(74) *Attorney, Agent, or Firm* — Kenja IP Law PC

(57) ABSTRACT

Provided is a composition for a non-aqueous secondary battery porous membrane capable of forming a porous membrane having excellent peel strength and capable of providing a non-aqueous secondary battery having excellent output characteristics. The composition for a non-aqueous secondary battery porous membrane contains inorganic particles, a binder, a surfactant, and water. The binder includes a polymer including an aromatic vinyl monomer unit. Fractional content of the surfactant is not less than 0.25 parts by mass and not more than 5 parts by mass per 100 parts by mass of the inorganic particles.

11 Claims, No Drawings

COMPOSITION FOR NON-AQUEOUS SECONDARY BATTERY POROUS MEMBRANE, POROUS MEMBRANE FOR NON-AQUEOUS SECONDARY BATTERY, AND NON-AQUEOUS SECONDARY BATTERY

TECHNICAL FIELD

The present disclosure relates to a composition for a non-aqueous secondary battery porous membrane, a porous membrane for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A secondary battery normally includes battery components such as a positive electrode, a negative electrode, and a separator that separates the positive electrode and the negative electrode, and prevents short-circuiting between the positive electrode and the negative electrode. There are cases in which a porous membrane is provided as a protective layer on an electrode (positive electrode or negative electrode) or separator in a secondary battery with the aim of improving heat resistance and strength of the electrode or separator.

The porous membrane may, for example, be a porous membrane that is formed through binding of non-conductive particles, such as organic particles or inorganic particles, by a binder. This kind of porous membrane is typically formed by preparing a slurry composition (hereinafter, also referred to as a "composition for a porous membrane") containing porous membrane materials, such as non-conductive particles and a binder, that are dissolved or dispersed in a dispersion medium, such as water, applying the composition for a porous membrane onto a substrate, such as an electrode or a separator, and drying the applied composition for a porous membrane.

In recent years, there has been much activity directed toward improving porous membranes with the aim of providing non-aqueous secondary batteries having even higher performance (for example, refer to Patent Literature (PTL) 1).

In one specific example, PTL 1 proposes that by using a binder for a non-aqueous secondary battery porous membrane containing a particulate polymer that is formed by a random copolymer including a (meth)acrylic acid alkyl ester monomer unit in a proportion of 35 mass % or more and an aromatic monovinyl monomer unit in a proportion of not less than 20 mass % and not more than 65 mass %, and that has a degree of swelling in non-aqueous electrolyte solution of more than a factor of 1 and not more than a factor of 2, durability of a porous membrane is improved, and stability of the composition for a porous membrane under high shear is increased.

CITATION LIST

Patent Literature

PTL 1: WO 2015/145967 A1

SUMMARY

Technical Problem

However, with respect to a composition for a porous membrane in which the conventional binder for a non-aqueous secondary battery porous membrane described above is used, there is room for improvement in terms of improving the peel strength of a porous membrane formed using the composition for a porous membrane and also improving output characteristics of a secondary battery including a porous membrane formed using the composition for a porous membrane.

Accordingly, an objective of the present disclosure is to provide a composition for a non-aqueous secondary battery porous membrane capable of forming a porous membrane having excellent peel strength and capable of providing a non-aqueous secondary battery having excellent output characteristics.

Another objective of the present disclosure is to provide a porous membrane for a non-aqueous secondary battery that has excellent peel strength and is capable of providing a non-aqueous secondary battery having excellent output characteristics, and also to provide a non-aqueous secondary battery that includes this porous membrane for a non-aqueous secondary battery and can display excellent output characteristics.

Solution to Problem

The inventor conducted diligent investigation with the aim of solving the problems set forth above. The inventor discovered that a porous membrane having excellent peel strength and a non-aqueous secondary battery having excellent output characteristics can be obtained by using a composition for a porous membrane that contains inorganic particles, a binder including an aromatic vinyl monomer unit-containing polymer, and a surfactant, and in which fractional content of the surfactant is within a specific range, and in this manner completed the present disclosure.

Specifically, the present disclosure aims to advantageously solve the problems set forth above by disclosing a composition for a non-aqueous secondary battery porous membrane comprising inorganic particles, a binder, a surfactant, and water, wherein the binder includes a polymer including an aromatic vinyl monomer unit, and fractional content of the surfactant is not less than 0.25 parts by mass and not more than 5 parts by mass per 100 parts by mass of the inorganic particles. By using a composition for a porous membrane that contains a binder including an aromatic vinyl monomer unit-containing polymer and that contains a surfactant in a specific proportion as set forth above, it is possible to obtain a porous membrane having excellent peel strength and a non-aqueous secondary battery having excellent output characteristics.

The amount of surfactant referred to in the present disclosure can be measured in accordance with JIS K0400 (1999).

In the presently disclosed composition for a non-aqueous secondary battery porous membrane, the surfactant preferably includes a non-ionic surfactant, a sulfur atom-containing anionic surfactant, or a mixture thereof. When the surfactant includes a non-ionic surfactant, a sulfur atom-containing anionic surfactant, or a mixture thereof, foaming of the composition for a porous membrane can be inhibited to enable good formation of a porous membrane having few defects such as pinholes.

In the presently disclosed composition for a non-aqueous secondary battery porous membrane, a ratio M2/M1 of mass M2 of the surfactant relative to mass M1 of the polymer is preferably not less than 0.01 and not more than 0.5. When the polymer and the surfactant are contained in proportions within the range set forth above, foaming of the composition for a porous membrane can be inhibited to enable good formation of a porous membrane having few defects such as pinholes, and peel strength of a porous membrane can be further increased. Output characteristics of a secondary battery can also be enhanced.

In the presently disclosed composition for a non-aqueous secondary battery porous membrane, the polymer preferably includes a (meth)acrylic acid alkyl ester monomer unit having an alkyl group carbon number of not less than 6 and not more than 20 in a proportion of not less than 30 mass % and not more than 90 mass %. By using a polymer that includes a (meth)acrylic acid alkyl ester monomer unit having an alkyl group carbon number of not less than 6 and not more than 20 in the proportion set forth above, peel strength of a porous membrane and output characteristics of a secondary battery can be further enhanced.

In the presently disclosed composition for a non-aqueous secondary battery porous membrane, fractional content of the aromatic vinyl monomer unit in the polymer is preferably not less than 5 mass % and not more than 60 mass %. By using a polymer that includes an aromatic vinyl monomer unit in the proportion set forth above, peel strength of a porous membrane and output characteristics of a secondary battery can be further enhanced.

Moreover, the present disclosure aims to advantageously solve the problems set forth above by disclosing a porous membrane for a non-aqueous secondary battery formed from the composition for a non-aqueous secondary battery porous membrane set forth above. The porous membrane has excellent peel strength and is capable of providing a non-aqueous secondary battery having excellent output characteristics.

Furthermore, the present disclosure aims to advantageously solve the problems set forth above by disclosing a non-aqueous secondary battery comprising a positive electrode, a negative electrode, a separator, and an electrolyte solution, wherein the porous membrane for a non-aqueous secondary battery set forth above is included at a surface of at least one battery component selected from the group consisting of the positive electrode, the negative electrode, and the separator. The non-aqueous secondary battery has excellent output characteristics and high performance.

Advantageous Effect

Through the presently disclosed composition for a non-aqueous secondary battery porous membrane, it is possible to provide a porous membrane having excellent peel strength and a non-aqueous secondary battery having excellent output characteristics.

Moreover, according to the present disclosure, it is possible to provide a porous membrane for a non-aqueous secondary battery that has excellent peel strength and is capable of providing a non-aqueous secondary battery having excellent output characteristics, and also to provide a non-aqueous secondary battery that includes this porous membrane for a non-aqueous secondary battery and can display excellent output characteristics.

DETAILED DESCRIPTION

The following provides a detailed description of embodiments of the present disclosure.

The presently disclosed porous membrane for a non-aqueous secondary battery is formed using the presently disclosed composition for a non-aqueous secondary battery porous membrane. Also, the presently disclosed non-aqueous secondary battery includes the presently disclosed porous membrane for a non-aqueous secondary battery at the surface of at least one battery component.

(Composition for Non-Aqueous Secondary Battery Porous Membrane)

The presently disclosed composition for a non-aqueous secondary battery porous membrane is a slurry composition that contains inorganic particles, a binder, a surfactant, and water, and may optionally further contain other components.

The presently disclosed composition for a porous membrane can be used to provide a porous membrane for a secondary battery having excellent peel strength and a secondary battery having excellent output characteristics.

<Inorganic Particles>

The inorganic particles are particles that have a property of non-conductivity and that maintain their shape without dissolving in water used as a dispersion medium in the composition for a porous membrane and in a non-aqueous electrolyte solution of a secondary battery. The inorganic particles are also electrochemically stable and are, therefore, present stably in a porous membrane in the environment of use of a secondary battery. As a result of the composition for a porous membrane containing the inorganic particles, a reticulated structure of an obtained porous membrane can be appropriately blocked such that lithium dendrites and the like are prevented from passing through the porous membrane, and short-circuiting between electrodes can be more reliably prevented.

Examples of the inorganic particles include particles of an oxide such as aluminum oxide (alumina), hydrated aluminum oxide (boehmite), silicon oxide, magnesium oxide, titanium oxide, $BaTiO_2$, ZrO, or alumina-silica complex oxide; particles of a nitride such as aluminum nitride or boron nitride; particles of covalent crystals such as silicon or diamond; particles of a water-insoluble metal salt such as barium sulfate, calcium fluoride, or barium fluoride; and fine particles of a clay such as talc or montmorillonite.

Of these examples, oxide particles or water-insoluble metal salt particles are preferable as the inorganic particles.

The particle diameter of the inorganic particles is not specifically limited and can be the same as that of conventionally used inorganic particles.

<Binder>

The binder used in the presently disclosed composition for a non-aqueous secondary battery porous membrane ensures strength of an obtained porous membrane and also holds components contained in the porous membrane so that the components do not become detached from the porous membrane. The binder includes a polymer including an aromatic vinyl monomer unit. Note that the binder may also include a polymer other than an aromatic vinyl monomer unit-containing polymer.

[Aromatic Vinyl Monomer Unit-Containing Polymer]

The aromatic vinyl monomer unit-containing polymer (hereinafter, also referred to simply as "the polymer") includes at least an aromatic vinyl monomer unit and may optionally further include a (meth)acrylic acid alkyl ester monomer unit and/or other monomer units. Although no specific limitations are placed on the form of the polymer in the composition for a porous membrane, the polymer is normally in a particulate form.

The phrase "includes a monomer unit" as used in the present disclosure means that "a polymer obtained with the monomer includes a structural unit derived from the monomer". Moreover, "(meth)acryl" is used to indicate "acryl" and/or "methacryl" in the present disclosure.

The following provides a detailed description of the aromatic vinyl monomer unit-containing polymer that is included in the binder used in the presently disclosed composition for a non-aqueous secondary battery porous membrane.

Aromatic Vinyl Monomer Unit

Examples of aromatic vinyl monomers that can be used to form the aromatic vinyl monomer unit include styrene, styrene sulfonic acid and salts thereof (for example, sodium styrenesulfonate), α-methylstyrene, vinyltoluene, and 4-(tert-butoxy)styrene. One of these aromatic vinyl monomers may be used individually, or two or more of these aromatic vinyl monomers may be used in combination.

As a result of the polymer including an aromatic vinyl monomer unit, the peel strength of a porous membrane can be increased, and output characteristics of a secondary battery can be enhanced.

The fractional content of the aromatic vinyl monomer unit in the polymer may be any value but is preferably 5 mass % or more, and more preferably 15 mass % or more, and is preferably 60 mass % or less, more preferably 40 mass % or less, and even more preferably 30 mass % or less. The peel strength of a porous membrane can be further increased when the fractional content of the aromatic vinyl monomer unit is not more than any of the upper limits set forth. Moreover, output characteristics of a secondary battery can be further enhanced when the fractional content of the aromatic vinyl monomer unit is not less than any of the lower limits set forth above.

(Meth)acrylic acid alkyl ester monomer Unit

Examples of (meth)acrylic acid alkyl ester monomers that can be used to form the (meth)acrylic acid alkyl ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, cyclohexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, cyclohexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid alkyl ester monomers, those having an alkyl group carbon number of not less than 6 and not more than 20 are preferable, cyclohexyl (meth)acrylate and 2-ethylhexyl (meth)acrylate are more preferable, and 2-ethylhexyl (meth)acrylate is even more preferable from a viewpoint of improving peel strength of a porous membrane while also improving output characteristics of a secondary battery.

In the present disclosure, "(meth)acrylate" is used to indicate "acrylate" and/or "methacrylate".

One of these (meth)acrylic acid alkyl ester monomers may be used individually, or two or more of these (meth)acrylic acid alkyl ester monomers may be used in combination.

The fractional content of the (meth)acrylic acid alkyl ester monomer unit in the polymer may be any value but is preferably 30 mass % or more, more preferably 50 mass % or more, and even more preferably 65 mass % or more, and is preferably 90 mass % or less, and more preferably 80 mass % or less. Moreover, the fractional content of a (meth)acrylic acid alkyl ester monomer unit having an alkyl group carbon number of not less than 6 and not more than 20 in the polymer is preferably 30 mass % or more, more preferably 50 mass % or more, and even more preferably 65 mass % or more, and is preferably 90 mass % or less, and more preferably 80 mass % or less. Output characteristics of a secondary battery can be further enhanced when the fractional content of the (meth)acrylic acid alkyl ester monomer unit is not more than any of the upper limits set forth above. Moreover, the peel strength of a porous membrane can be further improved when the fractional content of the (meth)acrylic acid alkyl ester monomer unit is not less than any of the lower limits set forth above.

Other Monomer Units

The polymer may include monomer units other than the aromatic vinyl monomer unit and the (meth)acrylic acid alkyl ester monomer unit described above. Examples of such other monomer units include, but are not specifically limited to, an acidic group-containing monomer unit and a cross-linkable monomer unit. The fractional content of other monomer units in the polymer is not specifically limited and may, for example, be 10 mass % or less, and preferably 5 mass % or less.

As described above, the acidic group-containing monomer unit and the cross-linkable monomer unit are monomer units other than the (meth)acrylic acid alkyl ester monomer unit and the aromatic vinyl monomer unit. Accordingly, the (meth)acrylic acid alkyl ester monomers and aromatic vinyl monomers (for example, styrene sulfonic acid and salts thereof) described above are not included among acidic group-containing monomers that can be used to form the acidic group-containing monomer unit and cross-linkable monomers that can be used to form the cross-linkable monomer unit.

Acidic Group-Containing Monomer Unit

Examples of acidic group-containing monomers that can be used to form the acidic group-containing monomer unit include carboxy group-containing monomers, sulfo group-containing monomers, and phosphate group-containing monomers.

Examples of carboxy group-containing monomers that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof.

Examples of ethylenically unsaturated monocarboxylic acids include acrylic acid, methacrylic acid, and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, and itaconic acid. Examples of acid anhydrides of ethylenically unsaturated dicarboxylic acids include maleic anhydride, acrylic anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleates.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Cross-Linkable Monomer Unit

A monomer that can form a cross-linked structure when polymerized may be used as a cross-linkable monomer that can form a cross-linkable monomer unit. Specific examples include a monofunctional monomer having a thermally cross-linkable group and one ethylenic double bond per molecule, and a polyfunctional monomer having two or more ethylenic double bonds per molecule. Examples of the thermally cross-linkable group included in the monofunctional monomer include an epoxy group, an N-methylol amide group, an oxetanyl group, an oxazoline group, and combinations thereof.

The cross-linkable monomer may be hydrophobic or hydrophilic.

When a cross-linkable monomer is referred to as "hydrophobic" in the present disclosure, this means that the cross-linkable monomer does not include a hydrophilic group, and when a cross-linkable monomer is referred to as "hydrophilic" in the present disclosure, this means that the cross-linkable monomer includes a hydrophilic group. The term "hydrophilic group" used with respect to a cross-linkable monomer refers to a carboxy group, a hydroxy group, a sulfo group, a phosphate group, an epoxy group, a thiol group, an aldehyde group, an amide group, an oxetanyl group, or an oxazoline group.

Examples of hydrophobic cross-linkable monomers (hydrophobic cross-linkers) include polyfunctional (meth)acrylates such as allyl (meth)acrylate, ethylene di(meth)acrylate, diethylene glycol di(meth)acrylate, triethylene glycol di(meth)acrylate, tetraethylene glycol di(meth)acrylate, and trimethylolpropane tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene.

Examples of hydrophilic cross-linkable monomers (hydrophilic cross-linkers) include vinyl glycidyl ether, allyl glycidyl ether, methylolacrylamide, and acrylamide.

One of these cross-linkable monomers may be used individually, or two or more of these cross-linkable monomers may be used in combination.

Production of Polymer

The polymer is produced through polymerization of a monomer composition that contains the monomers described above. A polymer that is a random copolymer can be obtained while suppressing formation of a block copolymer and a graft copolymer by initiating polymerization with the monomers of the monomer composition still in a monomer state, and not in a partially polymerized oligomer state.

The fractional content of each monomer in the monomer composition is usually the same as the fractional content the corresponding monomer unit in the desired polymer.

No specific limitations are placed on the method of polymerization of the polymer. For example, any of solution polymerization, suspension polymerization, bulk polymerization, and emulsion polymerization may be used. The polymerization reaction may be, for example, addition polymerization such as ionic polymerization, radical polymerization, or living radical polymerization. Commonly used emulsifiers, dispersants, polymerization initiators, polymerization aids, and the like may be used in the polymerization in an amount that is also the same as commonly used.

Properties of Polymer

Although no specific limitations are placed on the properties of the polymer, the polymer is preferably a random copolymer. Note that in a case in which the polymer is a particulate polymer and in which this particulate polymer includes a core structure and a shell structure, the shell structure is preferably a random copolymer. The following provides a detailed description of properties of the polymer including these properties.

Random Copolymer Structure and Glass-Transition Temperature

As a result of the polymer being a random copolymer, the polymer can be homogenized, durability of the polymer with respect to electrolyte solution can be improved, and dispersibility of the polymer in the composition for a porous membrane can be increased. Moreover, a rise in the viscosity of the composition for a porous membrane can be suppressed such that water can be easily removed from a porous membrane during drying.

In the present disclosure, judgement of whether a polymer is a random copolymer is made based on glass-transition temperature measurement.

Specifically, when a polymer that is a copolymer has one glass-transition temperature, this indicates that the polymer is a random copolymer. On the other hand, when a polymer has two or more glass-transition temperatures, this indicates that the polymer does not have a random copolymer structure, and is a block copolymer, a graft copolymer, or the like.

The "glass-transition temperature" of a polymer referred to in the present disclosure can be measured by a measurement method described in the EXAMPLES section of the present specification.

In the case of a polymer that is a random copolymer, the glass-transition temperature thereof is preferably 10° C. or lower, more preferably 5° C. or lower, and particularly preferably 0° C. or lower. Although no specific limitations are placed on the lower limit for the glass-transition temperature of the polymer, the lower limit is normally −100° C. or higher.

Particle Diameter

In a case in which the polymer is a particulate polymer, the volume-average particle diameter D50 of the particulate polymer is preferably 0.05 µm or more, and more preferably 0.2 µm or more, and is preferably 0.6 µm or less, and more preferably 0.5 µm or less. An obtained porous membrane can be provided with good durability when the volume-average particle diameter D50 of the particulate polymer is within any of the ranges set forth above. The "volume-average particle diameter D50" of the particulate polymer represents a particle diameter at which, in a particle size distribution (volume basis) measured by laser diffraction, the cumulative volume calculated from a small diameter end of the distribution reaches 50%.

Although no specific limitations are placed on the fractional content of the polymer in the composition for a porous membrane, the fractional content of the polymer relative to 100 parts by mass of the inorganic particles is preferably 1.5 parts by mass or more, more preferably 2.0 parts by mass or more, even more preferably 2.5 parts by mass or more, and particularly preferably 4.0 parts by mass or more, and is preferably 10 parts by mass or less, more preferably 9.0 parts by mass or less, and even more preferably 6.5 parts by mass or less. The peel strength of a porous membrane can be further increased when the fractional content of the polymer is not less than any of the lower limits set forth above. Moreover, output characteristics of a secondary battery can be further improved when the fractional content of the polymer is not more than any of the upper limits set forth above.

<Surfactant>

The surfactant acts as a wetting agent that improves wettability of the composition for a porous membrane in application of the composition onto a substrate and increases coating uniformity.

The surfactant is not specifically limited but is preferably a non-ionic surfactant, a sulfur atom-containing anionic surfactant, or a mixture thereof from a viewpoint of inhibiting foaming of the composition for a porous membrane and enabling good formation of a porous membrane having few defects such as pinholes.

Examples of non-ionic surfactants that can be used include polyoxyethylene alkyl ether surfactants, reactive surfactants, polyoxyethylene sorbitol fatty acid ester surfactants, polyoxyethylene fatty acid ester surfactants, polyoxyethylene hydrogenated castor oil surfactants, and polyoxyethylene alkylamine surfactants. Of these non-ionic surfactants, polyoxyethylene lauryl ether is preferable.

Examples of sulfur atom-containing anionic surfactants that can be used include sulfonic acid salt surfactants and sulfuric acid ester salt surfactants. Of these sulfur atom-containing anionic surfactants, sodium dodecylbenzenesulfonate is preferable.

In the case of a composition for a porous membrane containing a binder that includes a polymer produced by emulsion polymerization, the surfactant may be an emulsifier that was used in the polymerization. In other words, by producing the composition for a porous membrane by mixing: a binder produced using a surfactant as an emulsifier; non-conductive particles; a surfactant as a wetting agent; water; and other optional components, the surfactant used as an emulsifier and the surfactant that is a wetting agent may be contained together in the composition for a porous membrane.

The fractional content of the surfactant in the composition for a porous membrane relative to 100 parts by mass of the inorganic particles is required to be not less than 0.25 parts by mass and not more than 5 parts by mass, is preferably 0.3 parts by mass or more, more preferably 0.35 parts by mass or more, and even more preferably 0.4 parts by mass or more, and is preferably 4.5 parts by mass or less, more preferably 3.5 parts by mass or less, and even more preferably 1.4 parts by mass or less. When the fractional content of the surfactant is 0.25 parts by mass or more relative to 100 parts by mass of the inorganic particles, wettability of the composition for a porous membrane is improved, and good formation of a porous membrane on a battery component such as an electrode or a separator can be achieved. Particularly in a case in which the composition for a porous membrane is used to form a porous membrane on a separator, heat shrinkage of the separator on which the porous membrane is formed can be reduced (i.e., heat shrinkage resistance of the separator can be increased). Moreover, when the fractional content of the surfactant is 5.0 parts by mass or less relative to 100 parts by mass of the inorganic particles, the peel strength of a porous membrane can be increased. Foaming of the composition for a porous membrane can also be inhibited to enable good formation of a porous membrane having few defects such as pinholes.

A ratio M2/M1 of mass M2 of the surfactant relative to mass M1 of the previously described polymer in the composition for a porous membrane is preferably 0.01 or more, more preferably 0.03 or more, even more preferably 0.08 or more, and particularly preferably 0.1 or more, and is preferably 0.5 or less, more preferably 0.4 or less, and even more preferably 0.3 or less. Output characteristics of a secondary battery can be improved when the mass ratio M2/M1 is not less than any of the lower limits set forth above. Moreover, the peel strength of a porous membrane can be increased when the mass ratio M2/M1 is not more than any of the upper limits set forth above. Foaming of the composition for a porous membrane can also be inhibited to enable good formation of a porous membrane having few defects such as pinholes.

<Other Components>

The composition for a porous membrane may contain other optional components besides the components described above. No specific limitations are placed on these optional components so long as they do not have an excessively negative influence on battery reactions in a secondary battery in which the porous membrane is used. Furthermore, one of such optional components may be used, or two or more of such optional components may be used.

Examples of optional components that can be used include an electrolyte solution decomposition inhibitor and a viscosity modifier.

[Viscosity Modifier]

Of the other components mentioned above, a viscosity modifier is preferably contained in the composition for a porous membrane. The inclusion of a viscosity modifier in the composition for a porous membrane thickens the composition for a porous membrane and thereby adjusts the viscosity thereof so as to facilitate application of the composition.

Examples of viscosity modifiers that can be used include water-soluble polymers such as natural polymers, semi-synthetic polymers, and synthetic polymers.

When a substance is described as "water-soluble" in the present disclosure, this means that when 0.5 g of the substance is dissolved in 100 g of water at 25° C., insoluble content is less than 1.0 mass %. Also note that in the case of a substance for which the solubility thereof varies depending on the pH of water, the substance is considered to be "water-soluble" so long as there is at least one pH at which the substance satisfies the definition of "water-soluble" set forth above.

Natural Polymers

Examples of natural polymers that can be used include polysaccharides and proteins derived from plants or animals, fermentation treated products of these polysaccharides and proteins by microorganisms or the like, and heat treated products of these polysaccharides and proteins.

These natural polymers can be classified as plant-based natural polymers, animal-based natural polymers, microorganism-produced natural polymers, and so forth.

Examples of plant-based natural polymers that can be used include gum arabic, gum tragacanth, galactan, guar gum, carob gum, karaya gum, carrageenan, pectin, mannan, quince seed (marmelo), algal colloid (phaeophyceae extract), starch (derived from rice, corn, potato, wheat, or the like), and glycyrrhizin. Examples of animal-based natural polymers that can be used include collagen, casein, albumin, and gelatin. Examples of microorganism-produced natural polymers that can be used include xanthan gum, dextran, succinoglucan, and pullulan.

Semi-Synthetic Polymers

Examples of semi-synthetic polymers that can be used include cellulosic semi-synthetic polymers. Cellulosic semi-synthetic polymers can be categorized as non-ionic cellulosic semi-synthetic polymers, anionic cellulosic semi-synthetic polymers, and cationic cellulosic semi-synthetic polymers.

Examples of non-ionic cellulosic semi-synthetic polymers that can be used include alkyl celluloses such as methyl cellulose, methyl ethyl cellulose, ethyl cellulose, and microcrystalline cellulose; and hydroxyalkyl celluloses such as hydroxyethyl cellulose, hydroxybutyl methyl cellulose, hydroxypropyl cellulose, hydroxypropyl methyl cellulose, hydroxyethyl methyl cellulose, hydroxypropyl methyl cellulose stearoxy ether, carboxymethyl hydroxyethyl cellulose, alkyl hydroxyethyl cellulose, and nonoxynyl hydroxyethyl cellulose.

Examples of anionic cellulosic semi-synthetic polymers that can be used include substitution products obtained by substitution of the non-ionic cellulosic semi-synthetic polymers described above with various derivative groups and salts (sodium salts, ammonium salts, and the like) of these substitution products. Specific examples include sodium cellulose sulfate, methyl cellulose, methyl ethyl cellulose, ethyl cellulose, carboxymethyl cellulose (CMC), and salts thereof.

Examples of cationic cellulosic semi-synthetic polymers that can be used include low nitrogen hydroxyethyl cellulose dimethyl diallylammonium chloride (polyquaternium-4), O-[2-hydroxy-3-(trimethylammonio)propyl]hydroxyethyl cellulose chloride (polyquaternium-10), and O-[2-hydroxy-3-(lauryldimethylammonio)propyl]hydroxyethyl cellulose chloride (polyquaternium-24).

Synthetic Polymers

Examples of synthetic polymers that can be used include salts of polyacrylic acid such as sodium polyacrylate, polyvinyl alcohol, polyethylene oxide, polyvinyl pyrrolidone, copolymers of vinyl alcohol and acrylic acid or a salt of acrylic acid, fully or partially saponified copolymers of vinyl acetate and maleic anhydride, maleic acid, or fumaric acid, modified polyvinyl alcohol, modified polyacrylic acid, polyethylene glycol, polycarboxylic acid, ethylene-vinyl alcohol copolymers, vinyl acetate polymers, and acrylamide polymers having an introduced carboxy group.

Of these viscosity modifiers, carboxymethyl cellulose, a salt thereof, or an acrylamide polymer having an introduced carboxy group is preferable from a viewpoint of providing a porous membrane with heat resistance. Moreover, an acrylamide polymer having an introduced carboxy group is particularly preferable from a viewpoint of reducing the amount of water that is imported into a secondary battery and improving electrical characteristics.

The amount of the viscosity modifier in the composition for a porous membrane per 100 parts by mass of the inorganic particles is preferably 0.1 parts by mass or more, and more preferably 0.5 parts by mass or more, and is preferably 10 parts by mass or less, and more preferably 5 parts by mass or less. When the amount of the viscosity modifier is within any of the ranges set forth above, the composition for a porous membrane can be provided with an appropriate viscosity, and the durability of an obtained porous membrane can be improved.

<Production of Composition for Non-Aqueous Secondary Battery Porous Membrane>

Although no specific limitations are placed on the method by which the composition for a porous membrane is produced, the composition for a porous membrane is normally obtained by mixing the inorganic particles, the binder, the surfactant, water, and optional components that are used as necessary. Moreover, although no specific limitations are placed on the mixing method, the mixing may be performed using a disperser as a mixing device in order to efficiently disperse the components. Note that in a case in which the polymer included in the binder is produced by emulsion polymerization, water used in production of the polymer may also be used in production of the composition for a porous membrane. In other words, the composition for a porous membrane may be produced by adding the inorganic particles and the surfactant to a water dispersion of the polymer.

The disperser is preferably a device that enables homogeneous dispersion and mixing of the components. Examples of such devices include a ball mill, a sand mill, a pigment disperser, a grinding machine, an ultrasonic disperser, a homogenizer, and a planetary mixer. Of these examples, a high-level dispersing device such as a bead mill, a roll mill, or a FILMIX is particularly preferable since these devices can impart high dispersing shear.

The solid content concentration of the composition for a porous membrane can normally be freely set within a range in which the slurry composition has a viscosity within a range that does not cause loss of workability during production of a porous membrane. Specifically, the solid content concentration of the composition for a porous membrane can normally be 10 mass % to 50 mass %.

(Porous Membrane for Non-Aqueous Secondary Battery)

The composition for a secondary battery porous membrane set forth above may, for example, be applied onto the surface of a suitable substrate to form a coating film, and then the coating film that is formed may be dried to form a porous membrane for a non-aqueous secondary battery on the substrate. The porous membrane has excellent peel strength, and a non-aqueous secondary battery including the porous membrane has excellent output characteristics.

The substrate onto which the composition for a porous membrane is applied is a component that is a target for formation of a coating film of the composition for a porous membrane. There are no limitations on the substrate. For example, a coating film of the composition for a porous membrane may be formed on the surface of a detachable substrate, the coating film may be dried to form a porous membrane, and the detachable substrate may be peeled from the porous membrane. The porous membrane peeled from the detachable substrate as described above can be used in a secondary battery as a free-standing membrane.

However, from a viewpoint of omitting a step of peeling the porous membrane and improving production efficiency, it is preferable that a battery component is used as the substrate. Specific examples of the aforementioned battery component include a separator and an electrode. A porous membrane provided on a separator or an electrode can be suitably used as a protective layer for improving heat resistance, strength, and so forth of the separator or electrode.

<Separator>

A known separator such as an organic separator may be used as the separator without any specific limitations. An organic separator is a porous member that is made from an organic material. Examples of organic separators include a microporous membrane or non-woven fabric containing a polyolefin resin such as polyethylene or polypropylene, an aromatic polyamide resin, or the like. A microporous membrane or non-woven fabric made from polyethylene is preferable due to having excellent strength. Although the organic separator may be of any thickness, the thickness of the organic separator is normally 0.5 μm or more, and preferably 5 μm or more, and is normally 40 μm or less, preferably 30 μm or less, and more preferably 20 μm or less.

<Electrode>

Although no specific limitations are placed on the electrode (positive electrode, negative electrode), the electrode is for example obtained by forming an electrode mixed material layer on a current collector.

The current collector, an electrode active material (positive/negative electrode active material) and an electrode mixed material layer binder (positive/negative electrode mixed material layer binder) in the electrode mixed material layer, and the method by which the electrode mixed material layer is formed on the current collector may be known examples thereof such as those described in JP 2013-145763 A, for example.

<Formation Method of Porous Membrane for Non-Aqueous Secondary Battery>

Methods that can be used for forming the porous membrane on a battery component such as the separator or the electrode described above include:

(1) a method involving applying the composition for a porous membrane onto the surface of the battery component (surface at an electrode mixed material layer-side in the case of the electrode; same applies below) and subsequently drying the applied composition;

(2) a method involving immersing the battery component in the composition for a porous membrane and subsequently drying the battery component; and (3) a method involving applying the composition for a porous membrane onto a detachable substrate, drying the applied composition to produce a porous membrane, and transferring the obtained porous membrane onto the surface of the battery component.

Of these methods, method (1) is particularly preferable since it allows the thickness of the porous membrane to be easily controlled. In more detail, method (1) includes a step of applying the composition for a porous membrane onto the battery component (application step) and a step of drying the composition for a porous membrane that has been applied onto the battery component to form a porous membrane (porous membrane formation step).

No specific limitations are placed on the method by which the composition for a porous membrane is applied onto the battery component in the application step. For example, a method such as doctor blading, reverse roll coating, direct roll coating, gravure coating, extrusion coating, or brush coating may be used. Of these methods, gravure coating is preferable in terms that a uniform porous membrane is obtained.

The method by which the composition for a porous membrane is dried on the battery component in the porous membrane formation step is not specifically limited and can be a commonly known method. The drying method may, for example, be drying by warm, hot, or low-humidity air; drying in a vacuum; or drying by irradiation with infrared light, an electron beam, or the like. Although no specific limitations are placed on the drying conditions, the drying temperature is preferably 50° C. to 150° C., and the drying time is preferably 5 minutes to 30 minutes.

So long as the effects of the present disclosure are not significantly lost, a positive electrode, a negative electrode, or a separator may include other elements besides the presently disclosed porous membrane set forth above. For example, another layer may be provided between the battery component and the presently disclosed porous membrane as necessary. In this case, the presently disclosed porous membrane is provided indirectly on the surface of the battery component. Moreover, another layer may be further provided on the surface of the presently disclosed porous membrane.

The thickness of the porous membrane that is formed on the substrate is preferably 0.01 μm or more, more preferably 0.1 μm or more, and particularly preferably 1 μm or more, and is preferably 20 μm or less, more preferably 10 μm or less, and particularly preferably 5 μm or less. Sufficient porous membrane strength can be ensured through the thickness of the porous membrane being 0.01 μm or more, whereas diffusivity of electrolyte solution can be ensured and output characteristics of a secondary battery including the porous membrane can be improved through the thickness of the porous membrane being 20 μm or less.

(Non-Aqueous Secondary Battery)

The presently disclosed non-aqueous secondary battery includes a positive electrode, a negative electrode, a separator, and an electrolyte solution, wherein the porous membrane for a non-aqueous secondary battery set forth above is included at the surface of at least one battery component selected from the group consisting of the positive electrode, the negative electrode, and the separator.

The presently disclosed non-aqueous secondary battery has excellent output characteristics and high performance as a result of including a porous membrane obtained from the presently disclosed composition for a porous membrane.

<Positive Electrode, Negative Electrode, Separator, and Porous Membrane>

The positive electrode, the negative electrode, the separator, and the porous membrane may be the same as any of the examples given in the "Porous membrane for non-aqueous secondary battery" section, and any of the techniques described in that section may be adopted as the method by which the porous membrane is provided at the surface of the positive electrode, negative electrode, and/or separator.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution other than being an organic solvent in which the supporting electrolyte can dissolve. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), methyl ethyl carbonate (MEC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The non-aqueous secondary battery can be produced by, for example, stacking the positive electrode and the negative electrode with the separator in-between, performing rolling, folding, or the like of the resultant stack as necessary to place the stack in a battery container, injecting the electrolyte solution into the battery container, and sealing the battery container. At least one component among the positive electrode, the negative electrode, and the separator is a porous membrane-equipped component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following describes the present disclosure through examples. However, the present disclosure is not limited to these examples. Note that "parts" and "%" in the present examples are by mass unless otherwise specified.

In the examples and comparative examples, the glass-transition temperature and volume-average particle diameter D50 of a particulate polymer were measured by methods described below. Moreover, the defoaming properties of a composition for a porous membrane, the peel strength of a porous membrane, the heat shrinkage resistance of a separator, and the output characteristics of a non-aqueous secondary battery were evaluated by methods described below.

<Glass-Transition Temperature>

A water dispersion containing a particulate polymer was dried for three days in an environment of 50% humidity and 23° C. to 25° C. to obtain a film having a thickness of 1±0.3 mm. This film was dried for 1 hour in a hot air oven at 120° C. The dried film was subsequently used as a sample in order to measure the glass-transition temperature Tg (° C.) in accordance with JIS K7121, with a measurement temperature of −100° C. to 180° C. and a heating rate of 5° C./min, and using a differential scanning calorimeter (DSC6220 produced by SII NanoTechnology Inc.).

<Volume-Average Particle Diameter D50>

The volume-average particle diameter D50 of a particulate polymer was measured using a laser diffraction/light scattering particle size distribution measurement apparatus (LS230 produced by Beckman Coulter, Inc.).

<Defoaming Properties>

Defoaming properties of a composition for a porous membrane were evaluated based on the Ross-Miles test method in JIS K3362. Specifically, 200 mL of an obtained composition for a porous membrane was dripped into 50 mL of the same composition over 30 seconds from 900 mm above while in a 25° C. environment, and the height of foam was measured 15 seconds after the end of this dripping. This measurement was repeated three times for one sample and then the arithmetic average of these three measurements was evaluated by the following standard. A lower foam height indicates better defoaming properties.

A: Foam height of less than 10 mm

B: Foam height of not less than 10 mm and less than 30 mm

C: Foam height of 30 mm or more

<Peel Strength>

An obtained separator for a secondary battery (porous membrane-equipped separator) was cut out as a rectangle of 100 mm in length and 10 mm in width to obtain a test specimen. Cellophane tape was affixed to a test stage in advance. Tape prescribed by JIS Z1522 was used as the cellophane tape. The test specimen that had been cut out from the porous membrane-equipped separator was adhered to the cellophane tape with the porous membrane-side thereof facing downward. Subsequently, the stress at the time when the separator was peeled by pulling one end thereof in a vertical direction at a pulling rate of 50 mm/min was measured. This measurement was performed three times and an average value of the measured stress was determined. This average value was taken to be the peel strength. The peel strength was evaluated by the following standard. A large peel strength indicates that the porous membrane has excellent adhesiveness prior to immersion in electrolyte solution.

A: Peel strength of 120 N/m or more

B: Peel strength of not less than 90 N/m and less than 120 N/m

C: Peel strength of less than 90 N/m

<Heat Shrinkage Resistance>

An obtained separator for a secondary battery (porous membrane-equipped separator) was cut out to 10 cm in width by 10 cm in length to obtain a test specimen. The test specimen was left for 1 hour inside an oven that had been temperature adjusted to 150° C. Thereafter, the length of each side of the test specimen was measured, and the shrinkage of a side having greatest shrinkage was evaluated by the following standard as the heat shrinkage. A smaller heat shrinkage indicates better heat shrinkage resistance.

A: Heat shrinkage of less than 3.0%

B: Heat shrinkage of not less than 3.0% and less than 5.0%

C: Heat shrinkage of not less than 5.0% and less than 10.0%

D: Heat shrinkage of 10.0% or more

<Output Characteristics>

A produced secondary battery was left for 24 hours in a 25° C. environment. The secondary battery was subsequently subjected to a charging operation (4.2 V, 0.1 C, 5 hours) in a 25° C. environment, and the voltage V0 (V) at this time was measured. Thereafter, the secondary battery was subjected to a discharging operation with a discharge rate of 1 C in a −10° C. environment, and the voltage V2 (V) at 15 seconds after the start of discharge was measured. The voltage change ΔV (mV) was calculated using a formula:

ΔV={V0−V2}×1,000, and was evaluated as shown below. A smaller value indicates better output characteristics (low-temperature characteristics).

A: Voltage change ΔV of 500 mV or less
B: Voltage change ΔV of more than 500 mV and not more than 700 mV
C: Voltage change ΔV of more than 700 mV and not more than 900 mV
D: Voltage change ΔV of more than 900 mV Example 1

<Production of Binder>

A reactor including a stirrer was supplied with 70 parts of deionized water and 0.5 parts of ammonium persulfate. The gas phase of the reactor was purged with nitrogen gas and the temperature was raised to 80° C. A monomer composition was obtained in a separate vessel by mixing 50 parts of deionized water, 0.8 parts of sodium dodecylbenzenesulfonate (NEOPELEX G15 produced by Kao Corporation) as an emulsifier, 65 parts of 2-ethylhexyl acrylate (2-EHA) as a (meth)acrylic acid alkyl ester monomer having an alkyl group carbon number of 8, 30 parts of styrene (ST) as an aromatic vinyl monomer, 1.0 parts of allyl methacrylate (AMA) as a cross-linkable monomer, and 4.0 parts of acrylic acid (AA) as an acidic group-containing monomer. The monomer composition was continuously added to the reactor over 4 hours to effect polymerization. The reaction was carried out at 80° C. during the addition. After the addition was complete, stirring was performed for a further 3 hours at 80° C. to complete the reaction and produce a water dispersion containing a particulate polymer as a binder.

In measurement of the glass-transition temperature of the obtained particulate polymer, only one glass-transition temperature (−15° C.) was observed and it was confirmed that the particulate polymer was a random copolymer. The volume-average particle diameter D50 of the particulate polymer was 300 nm.

<Production of Composition for Non-Aqueous Secondary Battery Porous Membrane>

A composition for a porous membrane was produced by mixing 4 parts in terms of solid content of the water dispersion of the particulate polymer (binder) described above, 1.5 parts of an acrylamide polymer having an introduced carboxy group (POLYSTRON® 117 (POLYSTRON is a registered trademark in Japan, other countries, or both) produced by Arakawa Chemical Industries, Ltd.) as a viscosity modifier, and 0.4 parts of polyoxyethylene lauryl ether (EMULGEN 120 produced by Kao Corporation) as a non-ionic polyoxyethylene alkyl ether surfactant relative to 100 parts of alumina filler (LS256 produced by Nippon Light Metal Co., Ltd.) as inorganic particles.

The obtained composition for a porous membrane was used to evaluate defoaming properties. The results are shown in Table 1.

<Production of Porous Membrane and Porous Membrane-Equipped Separator>

An organic separator (produced by Celgard, LLC.; thickness: 16 μm) that was formed by a porous substrate made from polyethylene was prepared. The composition for a porous membrane obtained as described above was applied onto one side of the organic separator that had been prepared and was dried for 10 minutes at 50° C. In this manner, a porous membrane-equipped separator of 18 μm in thickness was obtained.

The obtained porous membrane-equipped separator was used to evaluate peel strength and heat shrinkage resistance. The results are shown in Table 1.

<Production of Negative Electrode>

A 5 MPa pressure vessel equipped with a stirrer was charged with 33 parts of 1,3-butadiene, 3.5 parts of itaconic acid (IA), 63.5 parts of ST, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was terminated by cooling at the point at which the polymerization conversion rate reached 96% to yield a mixture containing a binder (SBR) for a negative electrode mixed material layer. The mixture containing the binder for a negative electrode mixed material layer was adjusted to pH 8 through addition of 5% sodium hydroxide aqueous solution, and then unreacted monomer was removed by thermal-vacuum distillation. Thereafter, the mixture was cooled to 30° C. or lower to obtain a water dispersion containing the target binder for a negative electrode mixed material layer.

Next, 100 parts of artificial graphite (volume-average particle diameter: 15.6 μm) as a negative electrode active material, 1 part in terms of solid content of a 2% aqueous solution of a sodium salt of carboxymethyl cellulose (MAC350HC produced by Nippon Paper Industries Co., Ltd.) as a viscosity modifier, and deionized water were mixed and adjusted to a solid content concentration of 68%, and then these materials were further mixed for 60 minutes at 25° C. Deionized water was then used to adjust the solid content concentration to 62%, and further mixing was performed for 15 minutes at 25° C. Deionized water and 1.5 parts in terms of solid content of the binder for a negative electrode mixed material layer were added to the mixture, the final solid content concentration was adjusted to 52%, and a further 10 minutes of mixing was performed. The resultant mixture was subjected to a defoaming process under reduced pressure to yield a slurry composition for a secondary battery negative electrode having good fluidity.

A comma coater was used to apply the obtained slurry composition for a negative electrode onto copper foil (current collector) of 20 μm in thickness such as to have a thickness of approximately 150 μm after drying. The applied slurry composition was dried by conveying the copper foil inside a 60° C. oven for 2 minutes at a speed of 0.5 m/min. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

<Production of Positive Electrode>

A slurry composition for a positive electrode was produced by combining 100 parts of LiCoO$_2$ having a volume-average particle diameter of 12 μm as a positive electrode active material, 2 parts of acetylene black (HS-100 produced by Denka Company Limited) as a conductive material, 2 parts in terms of solid content of polyvinylidene fluoride (#7208 produced by Kureha Corporation) as a binder for a positive electrode mixed material layer, and N-methylpyrrolidone in amounts such that the total solid content concentration was 70%, and then mixing these materials.

A comma coater was used to apply the obtained slurry composition for a positive electrode onto aluminum foil (current collector) of 20 μm in thickness such as to have a thickness of approximately 150 μm after drying. The applied slurry composition was dried by conveying the aluminum foil inside a 60° C. oven for 2 minutes at a speed of 0.5 m/min. Thereafter, heat treatment was performed for 2 minutes at 120° C. to obtain a pre-pressing positive electrode web. The pre-pressing positive electrode web was rolled by roll pressing to obtain a post-pressing positive electrode including a positive electrode mixed material layer of 80 μm in thickness.

<Production of Secondary Battery>

The post-pressing positive electrode obtained as described above was cut out as 49 cm×5 cm and was then placed with the surface at the positive electrode mixed material layer-side thereof as an upper side. A separator for a non-aqueous secondary battery (porous membrane-equipped separator) that had been cut out as 120 cm×5.5 cm was placed on the positive electrode such that the positive electrode was positioned at a longitudinal direction left-hand side of the separator. In addition, the post-pressing negative electrode obtained as described above was cut out as 50 cm×5.2 cm and was placed on the separator such that the surface at the negative electrode mixed material layer-side of the negative electrode and the separator faced one another and such that the negative electrode was positioned at a longitudinal direction right-hand side of the separator. The resultant product was then wound by a winding machine with the longitudinal direction middle of the separator at the center so as to obtain a roll (laminate). This roll was then pressed into a flat form at 60° C. and 0.5 MPa and was then enclosed in an aluminum packing case serving as a battery case. Electrolyte solution (solvent: EC/DEC/VC (volume mixing ratio)=68.5/30/1.5; electrolyte: $LiPF_6$ of 1 M in concentration) was injected such that no air remained. In addition, the aluminum packing case was closed by heat sealing at 150° C. so as to tightly seal an opening of the aluminum packing case. Thereafter, the roll that had been sealed in the aluminum packing case was pressed, together with the aluminum packing case, for 2 minutes at a temperature of 80° C. and a pressure of 1 MPa, and thus a wound lithium ion secondary battery having a discharge capacity of 1,000 mAh was produced as a non-aqueous secondary battery.

The obtained secondary battery was used to evaluate output characteristics. The results are shown in Table 1.

Examples 2 and 3

A binder, a composition for a porous membrane, a porous membrane-equipped separator, a negative electrode, a positive electrode, and a secondary battery were produced in the same way as in Example 1 with the exception that the amount of EMULGEN 120 used in production of the composition for a porous membrane was changed as shown in Table 1. The same evaluations as in Example 1 were also carried out. The results are shown in Table 1.

Example 4

A binder, a composition for a porous membrane, a porous membrane-equipped separator, a negative electrode, a positive electrode, and a secondary battery were produced in the same way as in Example 1 with the exception that cyclohexyl acrylate (CHA) was used instead of 2-EHA in production of the binder. The same evaluations as in Example 1 were also carried out. The results are shown in Table 1. In measurement of the glass-transition temperature of a particulate polymer obtained in production of the binder, only one glass-transition temperature (20° C.) was observed and it was confirmed that the particulate polymer was a random copolymer. The volume-average particle diameter D50 of the particulate polymer was 300 nm.

Examples 5 and 6

A binder, a composition for a porous membrane, a porous membrane-equipped separator, a negative electrode, a positive electrode, and a secondary battery were produced in the same way as in Example 1 with the exception that the amounts of ST and 2-EHA used in production of the binder were changed as shown in Table 1. The same evaluations as in Example 1 were also carried out. The results are shown in Table 1. In measurement of the glass-transition temperature of a particulate polymer obtained in production of the binder, only one glass-transition temperature (Example 5: −50° C.; Example 6: 25° C.) was observed and it was confirmed that the particulate polymer was a random copolymer. The volume-average particle diameter D50 of the particulate polymer was 300 nm.

Examples 7 and 8

A binder, a composition for a porous membrane, a porous membrane-equipped separator, a negative electrode, a positive electrode, and a secondary battery were produced in the same way as in Example 1 with the exception that the amounts of the binder and EMULGEN 120 used in production of the composition for a porous membrane were changed as shown in Table 1. The same evaluations as in Example 1 were also carried out. The results are shown in Table 1.

Example 9

A binder, a composition for a porous membrane, a porous membrane-equipped separator, a negative electrode, a positive electrode, and a secondary battery were produced in the same way as in Example 1 with the exception that boehmite was used instead of alumina as inorganic particles in production of the composition for a porous membrane. The same evaluations as in Example 1 were also carried out. The results are shown in Table 1.

Example 10

A binder, a composition for a porous membrane, a porous membrane-equipped separator, a negative electrode, a positive electrode, and a secondary battery were produced in the same way as in Example 1 with the exception that sodium dodecylbenzenesulfonate (NEOPELEX G15 produced by Kao Corporation), which is a sulfur atom-containing anionic surfactant, was used instead of EMULGEN 120 in production of the composition for a porous membrane. The same evaluations as in Example 1 were also carried out. The results are shown in Table 1.

Example 11

A binder for a porous membrane, a composition for a porous membrane, a porous membrane-equipped separator, a negative electrode, a positive electrode, and a secondary battery were produced in the same way as in Example 1 with the exception that carboxymethyl cellulose (CMC) was used instead of POLYSTRON 117 as a viscosity modifier in production of the composition for a porous membrane. The same evaluations as in Example 1 were also carried out. The results are shown in Table 1.

Comparative Examples 1 and 2

A binder, a composition for a porous membrane, a porous membrane-equipped separator, a negative electrode, a positive electrode, and a secondary battery were produced in the same way as in Example 1 with the exception that the amount of EMULGEN 120 used in production of the composition for a porous membrane was changed as shown in Table 1. The same evaluations as in Example 1 were also carried out. The results are shown in Table 1.

TABLE 1

|  |  |  |  |  | Example 1 | Example 2 | Example 3 | Example 4 |
|---|---|---|---|---|---|---|---|---|
| Composition for non-aqueous secondary battery porous membrane | Inorganic particles |  | Type |  | Alumina | Alumina | Alumina | Alumina |
|  |  |  | Content (parts by mass) |  | 100 | 100 | 100 | 100 |
|  | Viscosity modifier |  | Type |  | POLYSTRON 117 | POLYSTRON 117 | POLYSTRON 117 | POLYSTRON 117 |
|  |  |  | Content (parts by mass) |  | 1.5 | 1.5 | 1.5 | 1.5 |
|  | Particulate polymer (binder) | Chemical composition | Aromatic vinyl monomer unit | Type | ST | ST | ST | ST |
|  |  |  |  | Fractional content (mass %) | 30 | 30 | 30 | 30 |
|  |  |  | (Meth)acrylic acid alkyl ester monomer unit having alkyl group carbon number of not less than 6 and not more than 20 | Type | 2-EHA | 2-EHA | 2-EHA | CHA |
|  |  |  |  | Alkyl group carbon number | 8 | 8 | 8 | 6 |
|  |  |  |  | Fractional content (mass %) | 65 | 65 | 65 | 65 |
|  |  |  | Other monomer units | Type | AA | AA | AA | AA |
|  |  |  |  | Fractional content (mass %) | 4 | 4 | 4 | 4 |
|  |  |  |  | Type | AMA | AMA | AMA | AMA |
|  |  |  |  | Fractional content (mass %) | 1 | 1 | 1 | 1 |
|  |  |  | Content M1 (parts by mass) |  | 4 | 4 | 4 | 4 |
|  | Surfactant |  | Type |  | EMULGEN 120 | EMULGEN 120 | EMULGEN 120 | EMULGEN 120 |
|  |  |  | Content M2 (parts by mass) |  | 0.400 | 0.300 | 1.400 | 0.400 |
| Mass ratio of polymer and surfactant |  |  | M2/M1 |  | 0.1 | 0.075 | 0.35 | 0.1 |
| Heat shrinkage resistance |  |  |  |  | A | B | A | A |
| Output characteristics |  |  |  |  | A | B | A | A |
| Peel strength |  |  |  |  | A | A | B | A |
| Defoaming properties |  |  |  |  | A | A | B | A |

|  |  |  |  |  | Example 5 | Example 6 | Example 7 | Example 8 |
|---|---|---|---|---|---|---|---|---|
| Composition for non-aqueous secondary battery porous membrane | Inorganic particles |  | Type |  | Alumina | Alumina | Alumina | Alumina |
|  |  |  | Content (parts by mass) |  | 100 | 100 | 100 | 100 |
|  | Viscosity modifier |  | Type |  | POLYSTRON 117 | POLYSTRON 117 | POLYSTRON 117 | POLYSTRON 117 |
|  |  |  | Content (parts by mass) |  | 1.5 | 1.5 | 1.5 | 1.5 |
|  | Particulate polymer (binder) | Chemical composition | Aromatic vinyl monomer unit | Type | ST | ST | ST | ST |
|  |  |  |  | Fractional content (mass %) | 5 | 60 | 30 | 30 |
|  |  |  | (Meth)acrylic acid alkyl ester monomer unit having alkyl group carbon number of not less than 6 and not more than 20 | Type | 2-EHA | 2-EHA | 2-EHA | 2-EHA |
|  |  |  |  | Alkyl group carbon number | 8 | 8 | 8 | 8 |
|  |  |  |  | Fractional content (mass %) | 90 | 35 | 65 | 65 |
|  |  |  | Other monomer units | Type | AA | AA | AA | AA |
|  |  |  |  | Fractional content (mass %) | 4 | 4 | 4 | 4 |
|  |  |  |  | Type | AMA | AMA | AMA | AMA |
|  |  |  |  | Fractional content (mass %) | 1 | 1 | 1 | 1 |
|  |  |  | Content M1 (parts by mass) |  | 4 | 4 | 9 | 2 |
|  | Surfactant |  | Type |  | EMULGEN 120 | EMULGEN 120 | EMULGEN 120 | EMULGEN 120 |
|  |  |  | Content M2 (parts by mass) |  | 0.400 | 0.400 | 0.270 | 0.900 |

TABLE 1-continued

|  |  |  |  |  |  |  |  |
|---|---|---|---|---|---|---|---|
| Mass ratio of polymer and surfactant | | M2/M1 | | 0.1 | 0.1 | 0.03 | 0.45 |
| | | Heat shrinkage resistance | | A | A | A | A |
| | | Output characteristics | | B | A | B | A |
| | | Peel strength | | A | B | A | B |
| | | Defoaming properties | | A | A | A | B |

| | | | | | Example 9 | Example 10 | Example 11 | Comparative Example 1 | Comparative Example 2 |
|---|---|---|---|---|---|---|---|---|---|
| Composition for non-aqueous secondary battery porous membrane | Inorganic particles | | Type | | Boehmite | Alumina | Alumina | Alumina | Alumina |
| | | | Content (parts by mass) | | 100 | 100 | 100 | 100 | 100 |
| | Viscosity modifier | | Type | | POLYSTRON 117 | POLYSTRON 117 | CMC | POLYSTRON 117 | POLYSTRON 117 |
| | | | Content (parts by mass) | | 1.5 | 1.5 | 1.5 | 1.5 | 1.5 |
| | Particulate polymer (binder) | Chemical composition | Aromatic vinyl monomer unit | Type | ST | ST | ST | ST | ST |
| | | | | Fractional content (mass %) | 30 | 30 | 30 | 30 | 30 |
| | | | (Meth)acrylic acid alkyl ester monomer unit having alkyl group carbon number of not less than 6 and not more than 20 | Type | 2-EHA | 2-EHA | 2-EHA | 2-EHA | 2-EHA |
| | | | | Alkyl group carbon number | 8 | 8 | 8 | 8 | 8 |
| | | | | Fractional content (mass %) | 65 | 65 | 65 | 65 | 65 |
| | | | Other monomer units | Type | AA | AA | AA | AA | AA |
| | | | | Fractional content (mass %) | 4 | 4 | 4 | 4 | 4 |
| | | | | Type | AMA | AMA | AMA | AMA | AMA |
| | | | | Fractional content (mass %) | 1 | 1 | 1 | 1 | 1 |
| | | | Content M1 (parts by mass) | | 4 | 4 | 4 | 4 | 4 |
| | Surfactant | | Type | | EMULGEN 120 | NEOPELEX G15 | EMULGEN 120 | EMULGEN 120 | EMULGEN 120 |
| | | | Content M2 (parts by mass) | | 0.400 | 0.400 | 0.400 | 6.000 | 0.100 |
| | Mass ratio of polymer and surfactant | | M2/M1 | | 0.1 | 0.1 | 0.1 | 1.5 | 0.025 |
| | | Heat shrinkage resistance | | | A | A | A | A | C |
| | | Output characteristics | | | A | A | A | B | C |
| | | Peel strength | | | A | A | A | C | B |
| | | Defoaming properties | | | A | A | A | C | B |

It can be seen from Table 1 that in each of Examples 1 to 11 in which a composition for a porous membrane was used that contained inorganic particles, a binder including an aromatic vinyl monomer unit-containing polymer, and a surfactant, and in which the fractional content of the surfactant was within the prescribed range, a porous membrane having excellent peel strength and a non-aqueous secondary battery having excellent output characteristics were obtained. The used composition for a porous membrane also had excellent defoaming properties in each of Examples 1 to 11. Moreover, a separator including a porous membrane formed using the composition for a porous membrane had excellent heat shrinkage resistance.

In contrast, the peel strength of a porous membrane was poor in Comparative Example 1 in which the fractional content of a surfactant exceeded the prescribed range. It can also be seen that the composition for a porous membrane of Comparative Example 1 had poor defoaming properties.

Output characteristics of a secondary battery were poor in Comparative Example 2 in which the fractional content of a surfactant fell below the prescribed range. It can also be seen that the porous membrane-equipped separator of Comparative Example 2 had poor heat shrinkage resistance.

The following points can also be taken from Table 1.

Examples 1 to 3 demonstrate that defoaming properties of a composition for a porous membrane and peel strength of a porous membrane can be improved, and that heat shrinkage resistance of a separator can also be improved through adjustment of the fractional content of the surfactant.

Examples 1, 5, and 6 demonstrate that peel strength of a porous membrane and output characteristics of a secondary battery can be improved through adjustment of the fractional content of an aromatic vinyl monomer unit and a (meth) acrylic acid alkyl ester monomer unit having an alkyl group carbon number of not less than 6 and not more than 20 in the polymer.

Examples 1, 7, and 8 demonstrate that defoaming properties of a composition for a porous membrane, peel strength of a porous membrane, and output characteristics of a secondary battery can be improved through adjustment of the ratio M2/M1 of mass M2 of the surfactant relative to mass M1 of the polymer.

INDUSTRIAL APPLICABILITY

According to the present disclosure, it is possible to provide a composition for a non-aqueous secondary battery porous membrane capable of forming a porous membrane having excellent peel strength and a non-aqueous secondary battery having excellent output characteristics.

Moreover, according to the present disclosure, it is possible to provide a porous membrane for a non-aqueous secondary battery that has excellent peel strength and is capable of providing a non-aqueous secondary battery having excellent output characteristics, and also to provide a non-aqueous secondary battery that includes this porous membrane for a non-aqueous secondary battery and has excellent output characteristics.

The invention claimed is:

1. A composition for a non-aqueous secondary battery porous membrane comprising inorganic particles, a binder, a surfactant, and water, wherein
the binder includes a polymer including an aromatic vinyl monomer unit, and
fractional content of the surfactant is not less than 0.25 parts by mass and not more than 0.9 parts by mass per 100 parts by mass of the inorganic particles.

2. The composition for a non-aqueous secondary battery porous membrane according to claim 1, wherein the surfactant includes a non-ionic surfactant, a sulfur atom-containing anionic surfactant, or a mixture thereof.

3. The composition for a non-aqueous secondary battery porous membrane according to claim 1, wherein a ratio M2/M1 of mass M2 of the surfactant relative to mass M1 of the polymer is not less than 0.01 and not more than 0.5.

4. The composition for a non-aqueous secondary battery porous membrane according to claim 3, wherein the ratio M2/M1 is not less than 0.01 and not more than 0.1.

5. The composition for a non-aqueous secondary battery porous membrane according to claim 1, wherein the polymer includes a (meth)acrylic acid alkyl ester monomer unit having an alkyl group carbon number of not less than 6 and not more than 20 in a proportion of not less than 30 mass % and not more than 90 mass %.

6. The composition for a non-aqueous secondary battery porous membrane according to claim 1, wherein fractional content of the aromatic vinyl monomer unit in the polymer is not less than 5 mass % and not more than 60 mass %.

7. A porous membrane for a non-aqueous secondary battery formed from the composition for a non-aqueous secondary battery porous membrane according to claim 1.

8. A non-aqueous secondary battery comprising a positive electrode, a negative electrode, a separator, and an electrolyte solution, wherein
the porous membrane for a non-aqueous secondary battery according to claim 6 is included at a surface of at least one battery component selected from the group consisting of the positive electrode, the negative electrode, and the separator.

9. The composition for a non-aqueous secondary battery porous membrane according to claim 1, wherein fractional content of the surfactant is not less than 0.25 parts by mass and not more than 0.4 parts by mass per 100 parts by mass of the inorganic particles.

10. The composition for a non-aqueous secondary battery porous membrane according to claim 1, wherein the polymer is a particulate polymer, and
a volume-average particle diameter D50 of the particulate polymer is 0.05 µm or more and 0.6 µm or less.

11. The composition for a non-aqueous secondary battery porous membrane according to claim 1, wherein the surfactant includes a non-ionic surfactant, and
the non-ionic surfactant is a polyoxyethylene alkyl ether surfactant.

* * * * *